United States Patent [19]

Chang

[11] Patent Number: 5,075,955
[45] Date of Patent: Dec. 31, 1991

[54] INDEXING APPARATUS

[76] Inventor: Kuo-Sen Chang, No. 110, Ta-Nuan Rd., Tu-Cheng Hsiang, Taipei Hsien, Taiwan

[21] Appl. No.: 602,489

[22] Filed: Oct. 24, 1990

[51] Int. Cl.$^5$ .............................................. B23Q 7/02
[52] U.S. Cl. .................... 29/563; 74/813 L; B23Q/7/02
[58] Field of Search ...................... 29/563, 36, 48.5 A, 29/48.5 R, 33 P; 408/67, 35; 409/165; 269/70; 74/817, 822, 813 C, 813 L, 126, 88, 37, 436, 826

[56] References Cited

U.S. PATENT DOCUMENTS

| | | | |
|---|---|---|---|
| 1,942,927 | 1/1934 | Johnson et al. | 29/563 X |
| 2,475,342 | 7/1949 | Vines | 408/67 |
| 2,968,973 | 1/1961 | Mead | 74/822 |
| 3,888,140 | 6/1975 | Mackelvie | 74/826 |
| 4,354,402 | 10/1982 | Scott | 74/822 |
| 4,406,180 | 9/1983 | Naumec | 74/813 L X |
| 4,721,017 | 1/1988 | Jorgensen et al. | 74/813 L |

Primary Examiner—William Briggs
Attorney, Agent, or Firm—Morgan & Finnegan

[57] ABSTRACT

An indexing apparatus includes a casing, an indexing unit, a gripping unit, a dynamic unit and a driving unit. The indexing unit includes a connecting rod journalled in the casing and having a top portion extending out of the casing, an indexing disc sleeved rigidly on the connecting rod, and several circumferentially equidistant limiting devices provided along the periphery of the indexing disc. The gripping unit slides along the periphery of the indexing disc and can engage with one of the limiting devices so as to prevent the gripping unit from sliding relative to the indexing disc. The dynamic unit supplies power to the indexing unit. The driving unit transfers motion of the dynamic unit to the indexing unit so as to rotate the indexing disc. In a case where the gripping unit is engaged with one of the limiting devices, the movement of the dynamic unit disengages the gripping unit from the limiting device so as to rotate the indexing disc until the gripping unit engages with the next limiting device.

3 Claims, 3 Drawing Sheets

INDEXING APPARATUS

BACKGROUND OF THE INVENTION

1. Field of the invention

This invention relates to an indexing apparatus, more particularly to an accurate indexing apparatus which can automatically move a workpiece along a circular path to a predetermined position at a selected time.

2. Description of the related art

Indexing apparatuses are widely used in automatic operations. However, it is difficult for a conventional indexing apparatus to accurately feed a workpiece to a predetermined position, resulting in a low quality product. As a result, it is often necessary to adjust the parts of a conventional indexing apparatus. Furthermore, frequent adjustment reduces the lifetime of an indexing apparatus.

SUMMARY OF THE INVENTION

It is therefore the main object of this invention to provide an accurate indexing apparatus.

According to this invention, an indexing apparatus includes a casing, an indexing unit, a gripping unit, a dynamic unit and a driving unit. The indexing unit includes a connecting rod journalled in the casing and having a top portion extending out of the casing, an indexing disc sleeved rigidly on the connecting rod, and several circumferentially equidistant limiting devices provided along the periphery of the indexing disc. The gripping unit slides along the periphery of the indexing disc and can engage with one of the limiting devices so as to prevent the gripping unit from sliding relative to the indexing disc. The dynamic unit supplies power to the indexing unit. The driving unit transfers motion of the dynamic unit to the indexing unit so as to rotate the indexing disc. In a case where the gripping unit is engaged with one of the limiting devices, the movement of the dynamic unit disengages the gripping unit from the limiting device so as to rotate the indexing disc until the gripping unit engages with the next limiting device.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
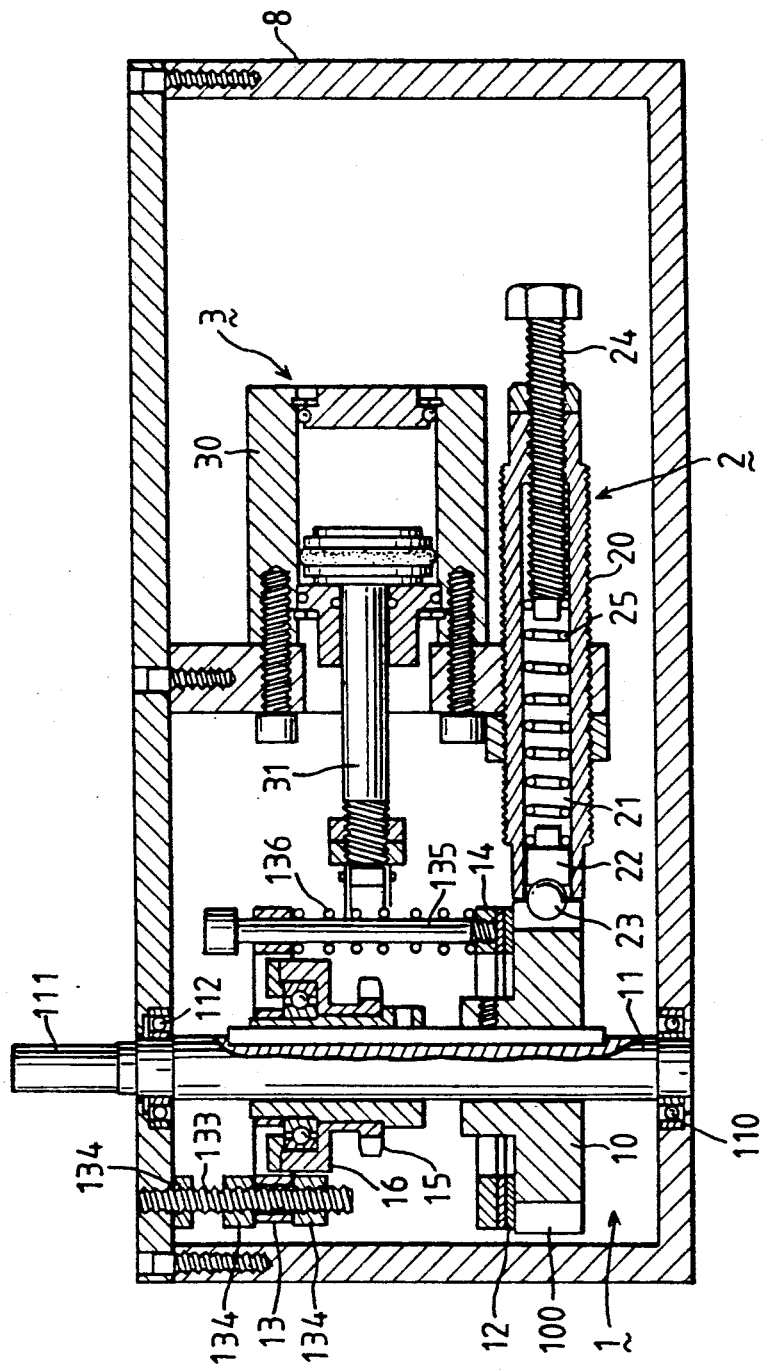
FIG. 1 is a sectional side view of an indexing apparatus according to this invention.
Figure 2:
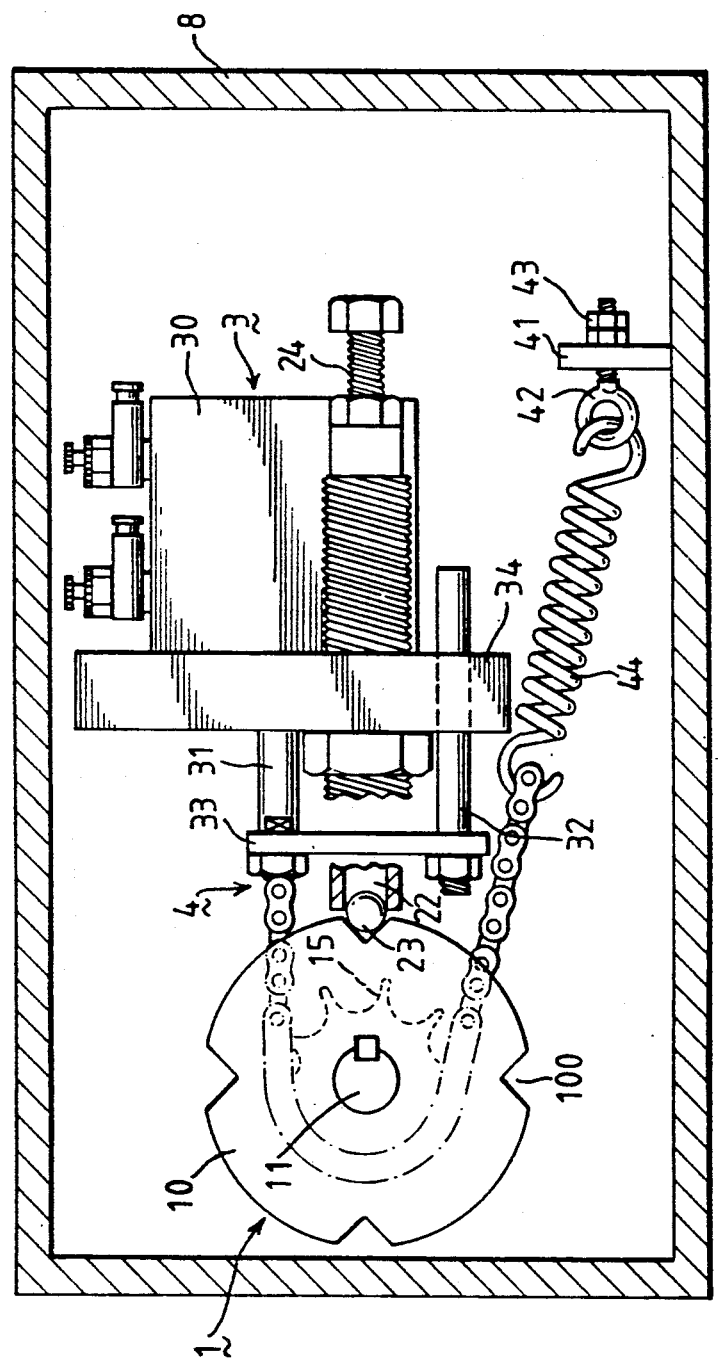
FIG. 2 is a sectional top view showing the indexing apparatus of this invention.

Referring to FIGS. 1, 2, an indexing apparatus of this invention includes an indexing unit 1, a gripping unit 2, a dynamic unit 3 and a driving unit 4. These units 1, 2, 3, 4 are all mounted in a casing 8.

The indexing unit 1 includes an indexing disc 10 having four circumferentially equidistant triangular notches or limiting devices 100, which are formed in the circumferential surface of the indexing disc 10. Any adjacent pair of the notches 100 are spaced angularly from each other at an angle of 90 degrees. A connecting rod 11 is journalled in the casing 8 by an upper bearing 112 and a lower bearing 110, and extends through the indexing disc 10. The top portion 111 of the connecting rod 11 extends out of the casing 8 so as to couple with a feeding unit. As illustrated, the connecting rod 11 is connected to the indexing disc 10 by a key and keyway arrangement so as to rotate the connecting rod 11 synchronously with the indexing disc 10.

Figure 3:
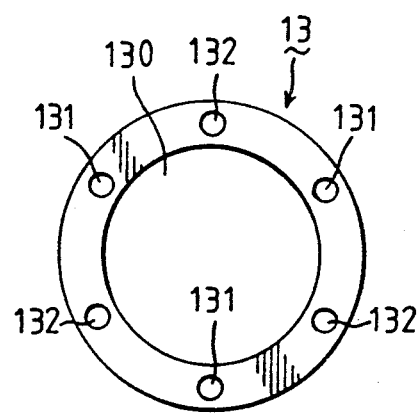
FIG. 3 is an elevational top view showing the ring plate of the indexing apparatus according to this invention.

A lower friction plate 12 is fixed on the top surface of the indexing disc 10. A ring plate 13 (see FIG. 3) has a central hole 130, a set of three first peripheral holes 131 and a set of three second peripheral holes 132. Three studs 133 extend through the first peripheral holes 131 of the ring plate 13 and the threaded holes in the casing 8, and are engaged with several nuts 134 so as to secure the ring plate 13 in the casing 8. The position of the ring plate 13 in the casing 8 can be adjusted by rotating the nuts 134 relative to the studs 133. Three mounting rods 135 extend through the second peripheral holes 132 of the ring plate 13 and have upper end flanges retaining the mounting rods 135 on the ring plate 13, and externally threaded lower ends to which an upper friction plate 14 is screwed. Three plate-pushing springs 136 are sleeved on the mounting rods 135 so as to bias the upper friction plate 14 to move downward, thereby pressing against the lower friction plate 12. The pressure of the upper friction plate 14 against the lower friction plate 12 can be adjusted by moving the ring plate 13 in the casing 8.

A sprocket 15 is sleeved rotatably on the connecting rod 11 by means of a conventional one-way bearing 16. Accordingly, the connecting rod 11 can rotate only when the sprocket 15 rotates clockwise.

The gripping unit 2 includes a tubular body 20 having a passage 21, in which a gripping member 22 is mounted slidably. The gripping member 22 carries a ball element 23 thereon, which is partially exposed to the exterior of the tubular body 20. A ball-pushing spring 25 biases the ball element 23 to press against the circumferential surface of the indexing disc 10. An adjustment bolt 24 is disposed on the tubular body 20 so as to adjust the pressure of the ball-pushing spring 25 against the indexing disc 10.

The dynamic unit 3 includes an air cylinder 30 fixed in the casing 8 which has a movable piston rod 31. An auxiliary rod 32 is connected securely to the piston rod 31 by a connecting plate 33. The auxiliary rod 32 extends through a bearing plate 34 which is secured to the air cylinder 30. A solenoid valve (not shown) is connected to the air cylinder 30 in a known manner so as to control the air flow in the air cylinder 30. The air cylinder 30 may be replaced with a hydraulic cylinder.

The driving unit 4 includes a chain 40 with links meshing with the teeth of the sprocket 15. The chain 40 is welded to the connecting plate 33 of the dynamic unit 3 at the upper end thereof. An anchor plate 41 is fixed on the casing 8. A ring member 42 has an externally threaded portion extending through the anchor plate 41 to engage with two lock nuts 43. A chain-pulling spring 44 biases the lower end of the chain 40 to move toward the ring member 42. The pull of the chain-pulling spring 44 toward the chain 40 can be adjusted by rotating the lock nuts 43.

When actuating the solenoid valve to move the piston rod 31 from the outermost position to the right, the upper end of the chain 40 moves toward the air cylinder 30 so as to rotate the sprocket 15 clockwise until the ball element 23 engages with the first notch 100 of the indexing disc 10. The engagement of the ball element 23 with the first notch 100 stops the indexing disc 10 with the assistance of the engagement of the upper friction plate 14 and the lower friction plate 12. Then, the actuation of the solenoid valve disengages the ball element 23 from the first notch 100 so as to continue the rotation of the indexing disc 10 until the ball element 23 engages within the second notch 100. In this way, the ball element 23 can subsequently engage with the third and fourth notches 100 during the inward movement of the piston rod 31 to the right. Accordingly, the rotation of the indexing disc 10 is stopped temporarily four times each revolution. This indexing process is suitable for a production line of automatic operation. When the piston rod 31 moves from the innermost position to the outermost position, the chain 40 rotates the sprocket 15 counterclockwise and cannot rotate the connecting rod 11, due to the fact that the one-way bearing 16 is interposed therebetween.

In use, the indexing apparatus can couple with a feeding unit which moves a workpiece to a working position along a circular path.

Figure 4:
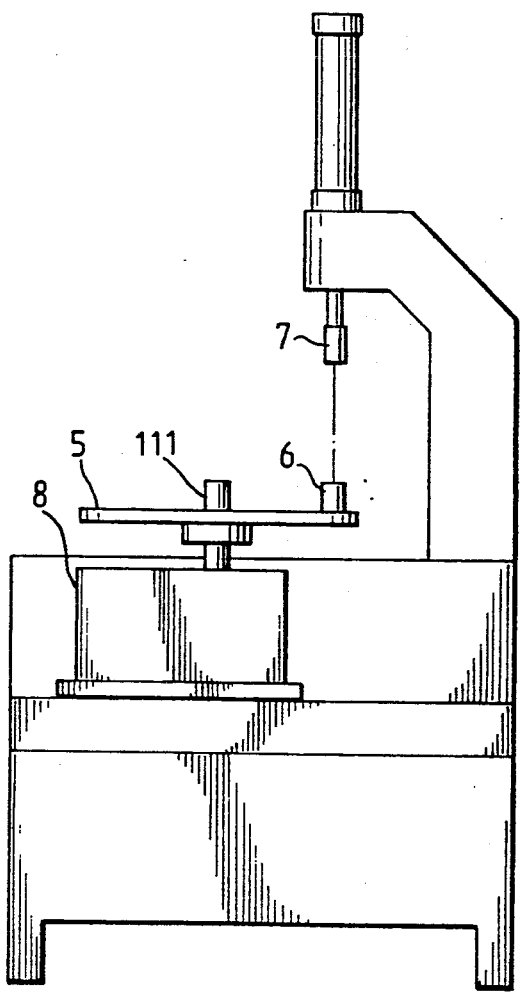
FIG. 4 is a schematic view illustrating the use of the indexing apparatus according to this invention.

FIG. 4 illustrates an application of the indexing apparatus to an automatic ultrasonic welding process. As illustrated, a feeding disc 5 is sleeved rigidly on the top portion 111 of the connecting rod 11. When the ball element 23 engages with a selected one of the notches 100 of the indexing disc 10, a workpiece 6 is moved to a position under an ultrasonic welding tool 7 along a circular path on the feeding disc 5.

In another application of the indexing apparatus, a specific feeding unit may be connected to the connecting rod 11 and feeds a workpiece to contact a grinding wheel under an automatic control.

The indexing apparatus of this invention can be certainly applied to other automatic machining processes.

It is understood that, when the number of the notches 100 is changed to three, the notches 100 are spaced angularly from each other at an angle of 120 degrees.

With this invention thus explained, it is apparent that numerous modifications and variations can be made without departing from the scope and spirit of this invention. It is therefore intended that this invention be limited only as indicated in the appended claims.

I claim:

1. An indexing apparatus, comprising:
   a casing;
   an indexing unit including a vertical connecting rod journalled in said casing and having a top portion extending out of said casing, an indexing disc sleeved rigidly on said connecting rod, several circumferentially equidistant limiting devices provided along the periphery of said indexing disc, a sprocket sleeved rotatably on said connecting rod and having a plurality of teeth, and a one-way bearing interconnecting said connecting rod and said sprocket so as to limit said indexing disc to rotate in a predetermined direction, said indexing disc having a top surface, a bottom surface and a circumferential surface, wherein said indexing unit includes a lower friction plate fixed on said top surface of said indexing disc, an upper friction plate placed on a top surface of said lower friction plate, and a plate-pushing spring biasing said upper friction plate to press against said lower friction plate;
   a gripping unit slidable along said periphery of said indexing disc and engageable with one of said limiting devices of said indexing unit so as to prevent said gripping unit from sliding relative to said indexing disc;
   a dynamic unit supplying power to said indexing unit, said dynamic unit including an air cylinder, said air cylinder having a piston rod which is movable in said casing;
   a driving unit transferring motion of said dynamic unit to said indexing unit so as to rotate said indexing disc, said driving unit including a chain fastened to said piston rod at an end thereof and having a series of links meshing with said teeth of said sprocket, and a chain-pulling spring biasing the other end of said chain to move away from said sprocket;
   whereby, in a case where said gripping unit is engaged with one of said limiting devices, movement of said dynamic unit disengaging said gripping unit from said one limiting device, so as to rotate said indexing disc until said gripping unit engages with the next one of said limiting devices; and, when said piston rod moves in one direction, said chain rotates said sprocket and said indexing disc; and when said piston rod moves in the opposite direction, said chain rotate said indexing disc.

2. An indexing apparatus as claimed in claim 1, wherein each of said limiting devices is a notch formed in said circumferential surface of said indexing disc, said gripping unit including a ball element and a ball-pushing spring biasing said ball element to engage within said notch.

3. An indexing apparatus as claimed in claim 2, wherein said gripping unit includes an adjustment bolt connected to an end of said ball-pushing spring so as to adjust pressure of said ball-pushing spring against said ball element.

* * * * *